May 18, 1937.  B. LANGE  2,080,613
LIGHT OPERATED ELECTRIC PHOTOMETER
Filed March 6, 1933
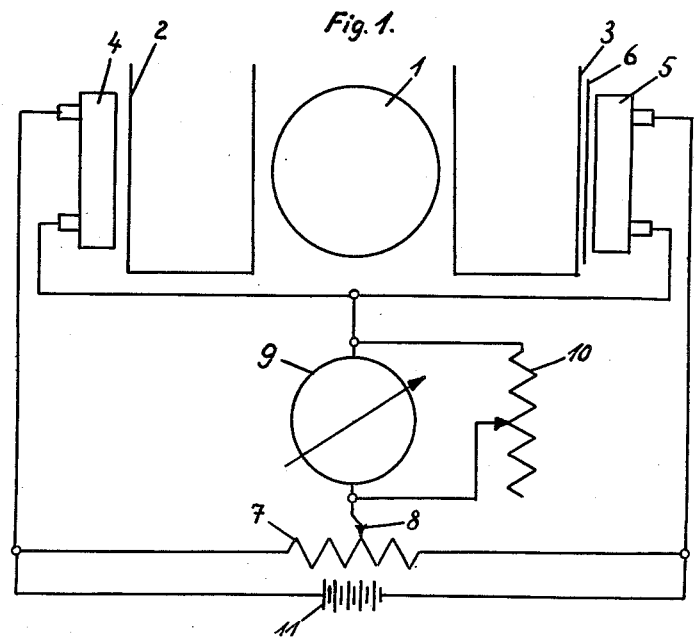
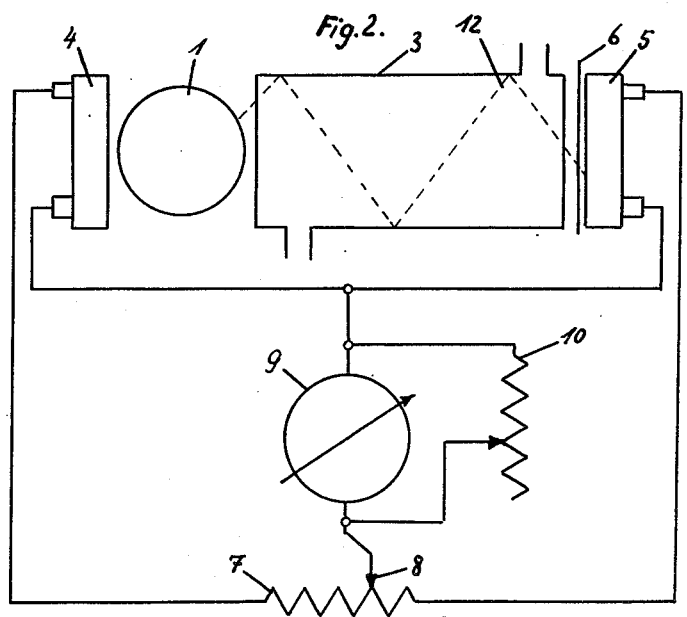

Patented May 18, 1937

2,080,613

UNITED STATES PATENT OFFICE 2,080,613

LIGHT OPERATED ELECTRIC PHOTOMETER

Bruno Lange, Berlin-Dahlem, Germany

Application March 6, 1933, Serial No. 659,607
In Germany March 8, 1932

1 Claim. (Cl. 250—41.5)

The employment of photo-cells for colorimetric and nephelometric measuring is known. It is likewise known, to employ for this purpose bridge connected photo-cells and to thus eliminate the influence of the variations in brightness of the photometer lamp on the measurings. In these apparatuses the measuring is carried out by bringing the solution to be measured between the source of light and one cell and by subsequently weakening the illuminating strength of the other cell by means of a grey wedge or variable gap, to such an extent that the photo currents of the two cells are similar and no current flows in the zero branch of the bridge. According to the invention the measuring is simplified in that the hand deflection of a galvanometer situated in the zero branch of the bridge allows to directly read the absorption or extinction on the galvanometer scale. The invention relates further to measures for increasing the measuring accuracy and to the apparative simplification of the photometer.

An embodiment of the invention is illustrated by way of example in the accompanying drawing in which:—

Fig. 1 shows the connection diagram of a photometer constructed as colorimeter and nephelometer.

Fig. 2 shows a similar photometer for continuously flowing fluids or gases for the continuous working control.

In Fig. 1 a source of light is designated by 1, 2 and 3 are two absorption vessels, 4 and 5 two photocells, 6 a filter arranged in front of one of the cells, 7 a resistance with an intermediate tap 8, 9 a galvanometer the scale of which is gauged in absorption or extinction values, 10 a resistance which regulates the sensitivity of the galvanometer and 11 as a source of E. M. F.

If the illuminating strength of both cells is the same, that is the liquids in the vessels 2 and 3 absorb the same quantity of light, no current flows through the galvanometer 9. If, however, one vessel absorbs more strongly, the illuminating strength of the corresponding cell is smaller, the equilibrium of the bridge is shifted and the galvanometer hand deflects. This deflection of the galvanometer depends, however, upon the illuminating strength of the lamp and upon the sensitivity of the cells, so that it is no positive measurement for the light absorption. In order to obtain absolute values, a filter 6 of known light absorption is, according to the invention, mounted in front of the cell 5 and the hand deflection of the galvanometer is set by means of the variable resistance 10 to a scale value corresponding to the absorption of the interposed filter. If, for example, the absorption of the interposed filter amounts to 100%, and if the hand deflection of the galvanometer is set to the extreme graduation line of a scale with 100 divisions, each graduation line corresponds to a 1% absorption independently of the brightness of the photometer lamp and of the sensitivity of the cells.

In the arrangement above described selenium resistance cells and also alkali cells can be employed. It has, however, been found that by employing rectifier photoelectric cells, such as for example Se or $Cu_2O$ cells, a considerable simplification and increase of sensitivity can be obtained. When employing these rectifier cells not only the auxiliary E. M. F. is dispensed with, but the sensitivity of the photometer increases owing to the strong photo-current. Physical deliberations and practical experiments have proved that a particularly high degree of sensitivity and measuring accuracy is attained by connecting in series the two rectifier cells so that they form with a resistance a Wheatstone bridge connection, so that a galvanometer in the zero branch of the bridge is connected up between the two cells and the intermediate tap of the resistance.

The photometer for continuously flowing fluids illustrated in Fig. 2 has the same bridge connection, only here rectifier cells are employed so that the external auxiliary E. M. F. 11 is omitted. The difference from the photometer illustrated in Fig. 1 is that here only one closed absorption vessel 2 is provided which has two apertures for the passage of the fluid. The sensitivity of the photometer, that is the magnitude of the galvanometer deflection, depends upon the length of the light absorbent layer. For constructional reasons it can however not be extended as desired. According to the application therefore the wall of the absorption vessel is made reflectant, so that the light path within the absorption vessel is considerably lengthened and consequently the sensitivity increases. The reflecting effect of the walls is indicated in Fig. 2 by the ray path 12. As can be seen, the light path is lengthened many times, the length of the absorption vessel remaining unchanged.

The galvanometer according to the invention is equipped with electric contacts, so that, if a certain light absorption is exceeded or not attained, the contacts are actuated and alarm or regulating devices engaged.

Finally it is pointed out, that a similar arrangement can be employed for determining smoke densities or smoke development.

I claim:—

In a photometric apparatus, comprising in combination, a single source of light, two blocking layer cells connected in series and both illuminated by said single source of light, terminals of opposite polarity of said cells inter-connected, a galvanometer connected in parallel to said two cells, a light filter between said source of light and one cell and a variable resistance in shunt with said galvanometer to regulate the sensitivity of said galvanometer and to adjust the deflection of the galvanometer to a scale of absolute values corresponding to the light absorption of the filter.

BRUNO LANGE.